Oct. 9, 1923. 1,469,769
W. N. BOOTH
METALLIC FELLY AND RIM FOR VEHICLE WHEELS
Filed April 23, 1919
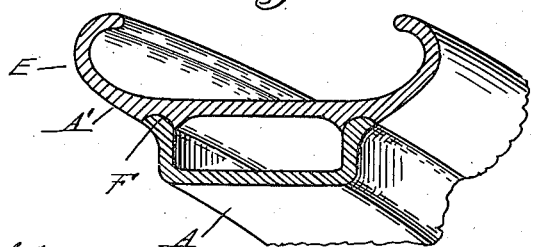
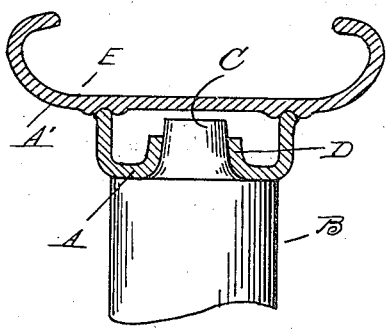
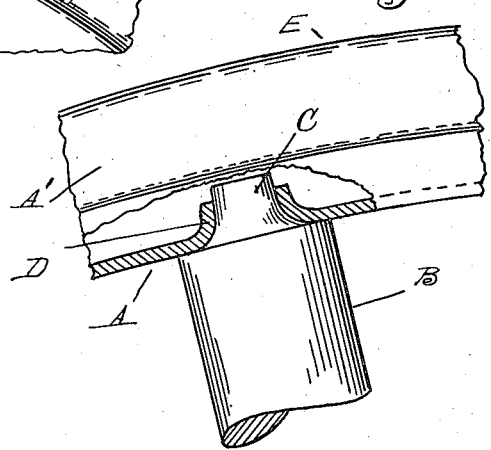
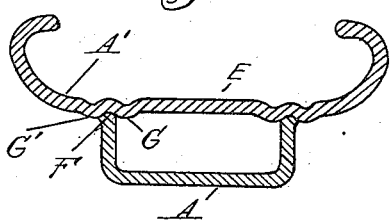
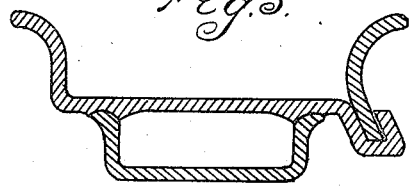
Inventor
William W. Booth
By Whittemore Hulbert & Whittemore
Attorneys Patented Oct. 9, 1923.

1,469,769

UNITED STATES PATENT OFFICE.

WILLIAM N. BOOTH, OF DETROIT, MICHIGAN.

METALLIC FELLY AND RIM FOR VEHICLE WHEELS.

Application filed April 23, 1919. Serial No. 292,148.

*To all whom it may concern:*

Be it known that I, WILLIAM N. BOOTH, a citizen of the United States of America, residing at Detroit, in the county of Wayne and State of Michigan, have invented certain new and useful Improvements in Metallic Fellies and Rims for Vehicle Wheels, of which the following is a specification, reference being had therein to the accompanying drawings.

The invention relates to vehicle wheels of that type comprising wooden spokes and metallic fellies. The invention has particular reference to the construction of felly as hereinafter set forth.

In the drawings:

Figure 1 is a sectional perspective view of a portion of the felly;

Figure 2 is a cross-section showing a slightly modified construction;

Figure 3 is a sectional elevation thereof;

Figure 4 is a cross-section showing another modification.

Figure 5 is a similar view showing still another modification.

A is a continuous annular felly of channel shaped cross-section; B are the spokes which are secured to the felly by any suitable means, such as by the tenoned end C engaging a rounded flange D struck into the channel from the web portion thereof. E is a rim which, as shown in Figs. 1 to 4, is of the clincher type. This rim is secured to the felly by forming therein the annular grooves F which register with and engage the outer edges of the side flanges A' of the felly. The felly and rim are engaged with each other by heating and expanding the rim and then shrinking it upon the felly.

To securely fasten the felly to the rim the outer edges of the channel are preferably fashioned to present an extended and rounded cross-section. This may be accomplished by forming the felly of rolled stock, and the rim may also be formed of rolled stock with grooves F therein of complementary form. If, however, it is desired to form these parts from pressed sheet metal of substantially uniform gauge, the rim may be formed as shown in Figure 4 with the inwardly extending beads G and G' forming a groove therebetween. Also instead of forming the felly as shown in Figure 1 it may be formed as shown in Figure 2 with the bearing portion only the thickness of the stock. However, the construction shown in Figure 1 is preferable.

In assembling the parts the linear expansion of the rim when heated will be sufficient to permit it to pass over the outer edges of the felly so as to register the grooves F with said flange. Upon cooling the rim will be drawn into firm contact with the flanges so as to be securely seated thereon, and the rounded form will guide the flanges to their seats.

In Figure 5 I have shown a rim of the non-clincher type, but engaged with the felly in a similar manner.

What I claim as my invention is:—

In a vehicle wheel, the combination of a metallic felly of channel section having outwardly extending annular flanges laterally deflected at their outer ends to form curved peripheral portions of greater width than the average thickness of the channel, and a continuous annular metallic rim provided with grooves rolled therein for registering with and fitting the curved peripheral portions of said felly and with portions on opposite sides of said grooves of a diameter less than the maximum diameter of the flanges, said rim being shrunk upon said felly.

In testimony whereof I affix my signature.

WILLIAM N. BOOTH.